United States Patent [19]
Bernhardt et al.

[11] Patent Number: 5,603,165
[45] Date of Patent: Feb. 18, 1997

[54] BOWLING BALL MEASURING TEMPLATE

[76] Inventors: David A. Bernhardt, 4921 Deer Creek Cir. South, Washington Township, Mich. 48094; Thomas A. Laskow, 354 Dover Milton Rd., Oak Ridge, N.J. 07438

[21] Appl. No.: 488,517

[22] Filed: Jun. 9, 1995

[51] Int. Cl.[6] ................ B43L 13/20; G01B 3/14
[52] U.S. Cl. .................. 33/509; 33/510; 33/562; 33/549
[58] Field of Search .............. 33/509, 510, 562, 33/549, 573; 73/65.02; 408/DIG. 1; 473/54

[56] References Cited

U.S. PATENT DOCUMENTS

| | | | |
|---|---|---|---|
| 3,161,041 | 12/1964 | Amburgey | 33/509 |
| 3,875,668 | 4/1975 | Taylor | 33/509 |
| 4,742,620 | 5/1988 | Manker | 33/510 |
| 5,092,054 | 3/1992 | Cipiti | 33/509 |
| 5,427,478 | 6/1995 | Boucher et al. | 408/DIG. 1 |

*Primary Examiner*—Christopher W. Fulton
*Attorney, Agent, or Firm*—Harness, Dickey & Pierce, P.L.C.

[57] ABSTRACT

A template for weighting and placement of finger holes in a bowling ball has a meridian plane indicator and an angular indicator. The meridian indicator includes a scale which determines the distance between placements of finger holes and a thumb hole for bowling balls. A second scale is on the angular indicator to determine placement of a weighted center of gravity with respect to a bowling ball pin. The angular indicator is positioned with respect to the meridian plane indicator such that the meridian plane indicator forms the supplementary plane of the angle indicating member.

12 Claims, 2 Drawing Sheets

BOWLING BALL MEASURING TEMPLATE

BACKGROUND AND SUMMARY OF THE INVENTION

The present invention relates to bowling ball accessories and, more particularly, to a template to weight and determine placement of finger and thumb holes in a bowling ball.

As the bowling ball continues to develop and evolve, it is important to ensure proper weighting and finger hole spacing in the ball. In bowling balls which include weight blocks which are specifically positioned to provide the bowling ball with optimum performance, it is necessary to correctly weight as well as position finger and thumb holes in the ball.

With the advent of weight blocks and reference pins on bowling balls, weighting and positioning finger holes in the ball has become more complex. Ordinarily, to weight a bowling ball and position finger and thumb holes in the bowling ball, the craftsman positions the ball onto a weighting machine and, by eyeballing the bowling ball, rotates it to hopefully a desired weight position. After this was done, the ball is again eye-balled to provide a new center of gravity with respect to the old true center of gravity. Once this process is complete, the craftsman eyeballs the position of the pin with respect to the center of gravity. After this is done, the craftsman again eyeballs and position marks on the bowling ball where the finger and thumb holes are to be drilled into the bowling ball.

As can be imagined, the bowling ball, with its high tech design, has now been weighted and has had holes drilled into it which has been done by complete guess work. Therefore, the guess work will offset any benefit of the bowling ball's high tech design. Thus, the bowler is unable to obtain peak efficiency and performance from his bowling ball. Thus, it is desirous to provide a device which will enable accurate determination of weight and position of finger and thumb holes in the bowling ball.

It is an object of the present invention to provide the art with a template which enables accurate weighting of a bowling ball. The present invention provides a measuring device to determine accurate placement of finger and thumb holes in the bowling ball. The present invention provides a scale to determine angular displacement of the weighted center of gravity with respect to the weight block indicator pin. Also the invention provides a method of weighting and determining placement of finger and thumb holes in the bowling ball.

Depending upon the amount of weight which is shifted to one side of the bowling ball or the other, this shift will have an influence on the amount of hook in the bowling ball as it rolls down a lane. Also, depending upon the positioning of the weight block indicator pin with respect to the weighted center of gravity of the ball, this positioning will provide the desired position of the weight block which again has an affect on the hook of the ball as it rolls down the alley or lane. By accurately positioning the indicator pin with respect to the weighted center of gravity, the bowling ball is able to perform at its optimum performance level. Thus, it is highly important that the bowling ball be accurately weighted and the placement of the finger and thumb holes be accurately determined.

From the following drawings, detailed description and appended claims, other objects and advantages of the present invention will become apparent to those skilled in the art.

DETAILED DESCRIPTION OF THE PREFERRED EMBODIMENT

Figure 1:
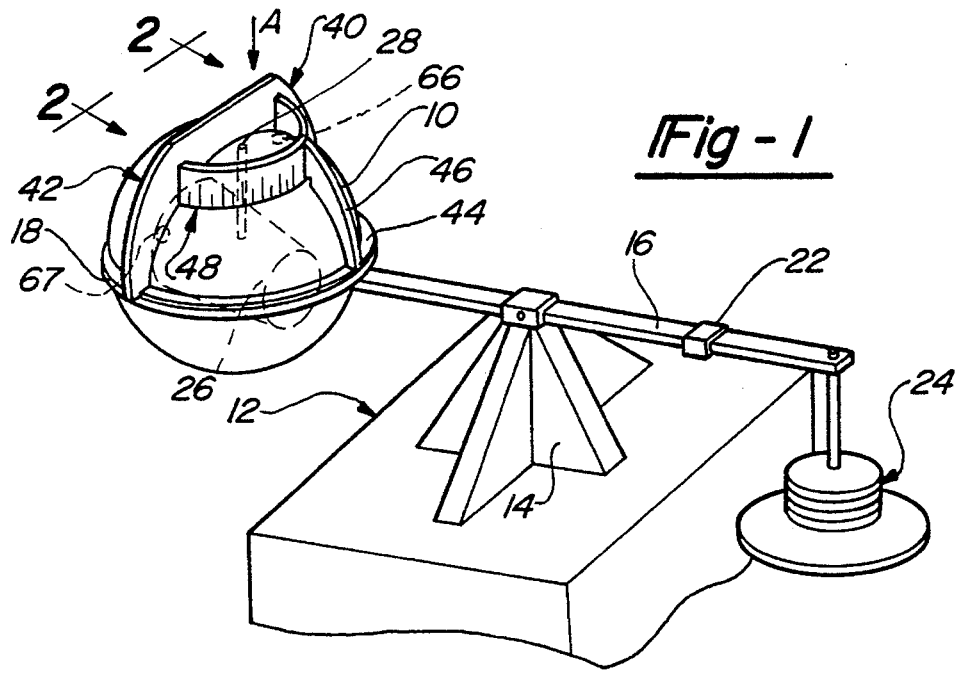
FIG. 1 is a perspective view of a weighing machine including a bowling ball and a bowling ball measuring template in accordance with the present invention.

Referring to FIG. 1, a bowling ball 10 is illustrated on a weighing machine 12 having a template 40 positioned on the bowling ball 10. The weighing machine 12 includes a fulcrum 14 and a balancing arm 16 with a bowling ball receiving ring 18 at one end, a sliding weight 22 on the arm 16, and a balancing weight 24 at the other end of the arm 16. The bowling ball 10 includes a weight block 26 and an indicator pin 28. Also the bowling ball 10 is marked with a true center of gravity 30.

Figure 2:
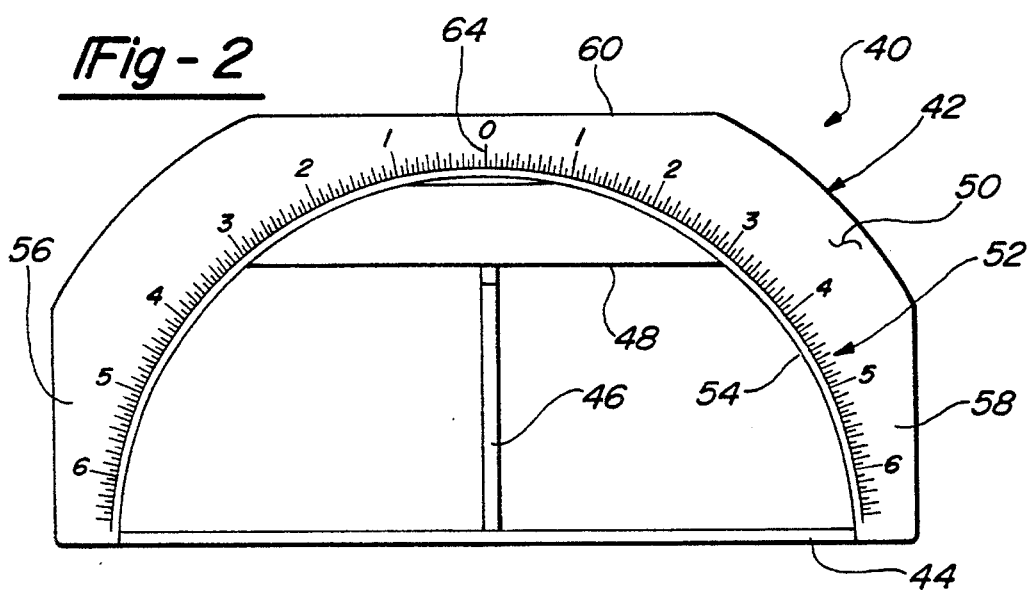
FIG. 2 is a front elevation view of FIG. 1 along the line 2—2 thereof.
Figure 3:
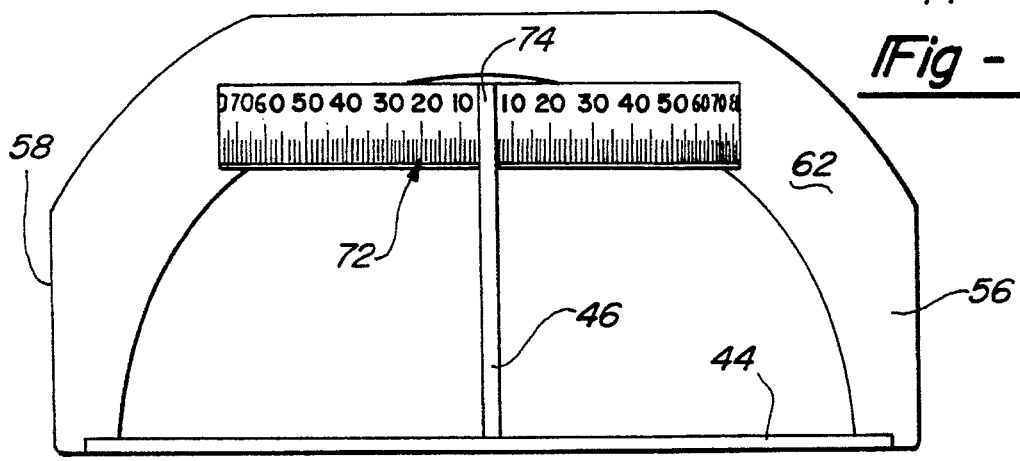
FIG. 3 is a rear elevation view of the template of FIG. 2.

Turning to FIGS. 2 and 3, the template 40 includes a meridian plane indicator 42, connected at both ends to a semi-circular base 44 which includes a support 46 extending from the base connecting with a semi-circular angle indicator 48 having both its ends secured to the meridian plane indicator 42.

The meridian plane indicator 42 has a planar surface 50 which includes a measuring scale 52. The meridian plane indicator 42 includes a cut-out 54 which is arcuate and approximates one hundred eighty (180°) degrees of a circle. Thus, the meridian plane indicator 42 has an overall inverted U-shape in plan as seen in FIG. 2 with legs 56, 58 and web 60 connecting the two. Also, the meridian plane indicator 42 has a surface 62 opposing the first planar surface which likewise is planar. The free ends of the legs 56, 58 are connected to the semi-circular base 44. The semi-circular base 44 aids in the stabilization of the legs 56, 58 of the meridian plane indicator 42.

The scale 52 is ordinarily a distance scale about the periphery of the cut-out. In this particular embodiment, the scale is illustrated with inch units, however a metric system could be imposed. The apex of the arc is designated with a zero point 64 and the units are equally fanned out from the zero point 64. The scale 52 is utilized in measuring the distance from a center of gravity of the bowling ball 10 to determine the placement of finger and thumb holes 66, 67 in the bowling ball.

The angle indicator 48 has an overall arcuate shape with a one hundred eighty (180°) degree arc circle. The zero degree point 68 and one hundred eighty (180°) degree point 70 are on the front face 50 of the meridian indicator plane 42 such that the front face 50 forms a supplementary plane of the angle indicator 48. The angle indicator 48 includes a circular degree scale 72 starting from zero at the apex 74 of its arcuate portion and moves ninety (90°) degrees in both directions. At the apex point 74, the support member 46 is connected in a complementary plane with the angle indicator 48. The scale 72 is in degrees enabling the user to determine the angle from the meridian plane with respect to the center of gravity and the bowling ball indicator pin 28.

The support member 46 stabilizes the angle indicator 48 with respect to the base 44 and the meridian plane indicator 42. Also, the support member 46 holds the angle indicator 48 in a level plane substantially parallel with the base 44 and transverse to the meridian plane as seen in FIGS. 2 and 3.

Figure 4:
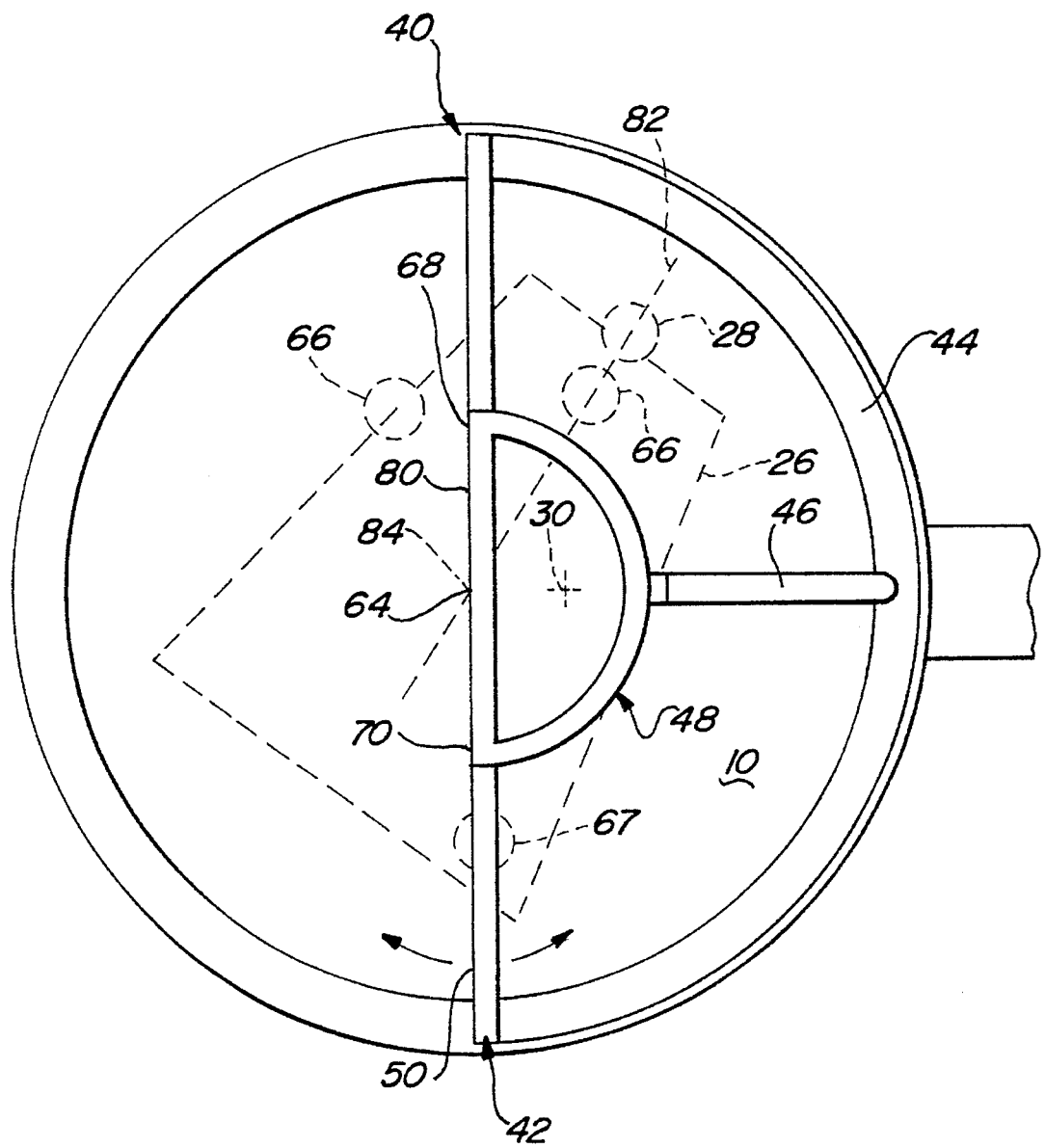
FIG. 4 is a top elevation view of the template on the bowling ball.

Turning to FIG. 4, the template 40 is illustrated positioned on the bowling ball 10 viewed in the direction of arrow of FIG. 1. With respect to FIG. 4, an explanation of weighting the ball will be given.

As seen in FIG. 4, the template 40 is positioned on the ball 10. At this point in time, the true center of gravity 30 is at the zero point 64 of the meridian plane indicator 42. The ball 10 is weighed out to the indicated weight such that the arm is balanced by the balancing weights 24 and fine adjustment sliding weight 22. At this time, an additional weight of a desired amount, for example one-half ounce, to produce a desired hook in the bowling ball is added to the course adjustment weight 24. The ball 10 is then rotated in either direction until the arm 16 is again balanced. As seen in phantom in FIG. 4, the true center of gravity 30 has been displaced to the right. At this point in time, a line 80 is drawn along the front face of the meridian plane indicator 42. With this determined, the angular position of the pin 28 with respect to the line 80 is determined. If the desired degree amount is for example sixty (60°) degrees with respect to the meridian plane, the angle is measured by the angle indicator 48 and a line 82 is drawn from the center of the pin 28 through the first line 80 to indicate a new weighted center of gravity 84 of the ball 10. Now, the placement of the finger and thumb holes 66 and 67 may be measured from the weighted center of gravity 84 utilizing the scale 52 on the meridian plane indicator 42.

Positioning the zero point 64 at the weighted center of gravity 84, the desired distance is measured along the meridian plane line 80 and marked. Next, the distance between finger holes 66 is measured and the finger holes 66 are ready to be drilled. The distance between the center of gravity and thumb hole 67 is determined and marked as described above. The thumb hole 67 is ready to be drilled. At this point in time, the ball would be drilled with the proper weighting and weighted center of gravity with respect to the bowling ball weight block indicator pin 28.

The template 40 is generally injection molded and the base, support, and both the angular indicator and meridian plane indicator are formed as one piece. The scales may be positioned onto the template after the forming of the template or the scales may be etched into the mold and be directly formed onto the template. Thus, the present invention provides a template which enables accurate weighting as well as the proper placement of finger holes in the bowling ball, thus, enhancing optimum performance of the bowling ball.

While the above detailed description describes the preferred embodiment of the present invention, the invention is susceptible to modification, variation and alteration without deviating from the scope and fair meaning of the subjoined claims.

What is claimed is:

1. A template for weighting and finger hole placement of bowling balls comprising:

an element defining a meridian plane on a bowling ball;

first scale means for enabling distance determination between placement of holes in the bowling ball, said first scale means coupled with said element defining said meridian plane;

second scale means for determining angular displacement with respect to a bowling ball pin, said second scale means being positioned in a lateral parallel plane with respect to said meridian plane, said second scale means coupled with said element.

2. The template according to claim 1, wherein a base member is coupled with said element.

3. The template according to claim 2, wherein a support member extends from said base and is coupled with said second scale means.

4. The template according to claim 3, wherein said support member is in a complementary plane with respect to said meridian plane.

5. A template for weighting and spacing finger holes in a bowling ball comprising:

a first member having a planar face and an arcuate cut-out, said planar face for defining a meridian plane on a bowling ball;

a first scale on said planar face for enabling placing of finger holes in the bowling ball;

a second arcuate member coupled with said first member, said second arcuate member positioned on a lateral parallel plane with respect to said said planar face;

a second scale on said second arcuate member for determining angular positioning with respect to a bowling ball pin.

6. The template according to claim 5, wherein said template is a one piece molded construction.

7. The template according to claim 5, wherein said first member has an overall U-shape with said second member coupled near a web of said U.

8. The template according to claim 7, wherein a third arcuate member is coupled with said first member near free ends of legs of said U.

9. The template according to claim 8, wherein a support member extends between said second and third arcuate members.

10. A method of weighting and placing finger holes in a bowling ball comprising:

providing a bowling ball, a bowling ball weighing scale, and a template having an element defining a meridian plane on a bowling ball, first scale means for enabling distance determination between placement of holes in the bowling ball, said first scale means coupled with said element and in said meridian plane, second scale means for determining angular displacement with respect to a bowling ball pin, said second scale means being positioned in a lateral parallel plane with respect to said meridian plane, said second scale means coupled with said element;

placing said bowling ball on said weighing scale;

locating a true center of gravity and pin on said bowling ball;

adjusting the ball if necessary to form a new weighted center of gravity and balancing the ball with desired weight;

marking the ball along said meridian plane to determine a center line;

adjusting the bowling ball to ensure the new weighted center of gravity is at the desired angle with respect to the pin by utilizing said second scale means; and utilizing said first scale means to define desired positions for drilling holes in the bowling ball.

11. The method according to claim 10, wherein defining said new center of gravity on said marked line.

12. The method according to claim 11, wherein marking the bowling ball such that the pin is in a desired angular position with respect to the new weighted center of gravity.

* * * * *